(12) United States Patent
Hiraishi

(10) Patent No.: US 11,415,957 B2
(45) Date of Patent: Aug. 16, 2022

(54) LADDER DISPLAY SYSTEM

(71) Applicant: Fanuc Corporation, Yamanashi (JP)

(72) Inventor: Yukihiro Hiraishi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 116 days.

(21) Appl. No.: 16/420,769

(22) Filed: May 23, 2019

(65) Prior Publication Data

US 2019/0369586 A1    Dec. 5, 2019

(30) Foreign Application Priority Data

May 31, 2018    (JP) .............................. JP2018-104949

(51) Int. Cl.
*G05B 19/05*    (2006.01)

(52) U.S. Cl.
CPC ......... *G05B 19/056* (2013.01); *G05B 19/054* (2013.01)

(58) Field of Classification Search
CPC ................ G05B 19/056; G05B 19/054; G05B 2219/36038; G05B 19/414
See application file for complete search history.

(56) References Cited

U.S. PATENT DOCUMENTS

| 7,143,366 B1* | 11/2006 | McKelvey | G05B 19/056 715/234 |
| 2005/0033457 A1* | 2/2005 | Yamane | G05B 19/056 700/18 |
| 2006/0190106 A1* | 8/2006 | Kay | H04L 67/1097 700/86 |
| 2015/0242296 A1* | 8/2015 | Mittal | G06F 11/3476 714/37 |
| 2017/0139390 A1* | 5/2017 | Shimoda | G05B 19/0426 |
| 2019/0018387 A1* | 1/2019 | Nagao | G05B 19/056 |

FOREIGN PATENT DOCUMENTS

| JP | 07306703 A | 11/1995 |
| JP | 2010079354 A | 4/2010 |
| JP | 2015053022 A | 3/2015 |
| JP | 2016-004414 A | 1/2016 |

OTHER PUBLICATIONS

Japanese Notice of Reasons for Refusal for Japanese Application No. 2018-104949, dated Aug. 27, 2020 with translation, 4 pages.

* cited by examiner

*Primary Examiner* — Kenneth M Lo
*Assistant Examiner* — Tameem D Siddiquee
(74) *Attorney, Agent, or Firm* — RatnerPrestia

(57) ABSTRACT

A ladder display system includes: a first controller having a first ladder program; and a second controller having a second ladder program that performs input/output processing with the first ladder program. An input/output signal table generating unit generates an input/output signal table relating an input/output signal of the first ladder program to an input/output signal of the second ladder program. An external reference execution unit specifies a signal of the second ladder program and requests transmission of at least a part of the first ladder program. A ladder program output unit transmits at least a part of the first ladder program including a signal corresponding to the specified signal to the second controller. A ladder program display unit displays at least the part of the first ladder program output by the ladder program output unit on the second controller.

3 Claims, 10 Drawing Sheets

| INPUT/OUTPUT SIGNAL TABLE ||||
|---|---|---|---|
| OUTPUT SIGNAL OF FIRST CONTROLLER | INPUT SIGNAL OF SECOND CONTROLLER | OUTPUT SIGNAL OF SECOND CONTROLLER | INPUT SIGNAL OF FIRST CONTROLLER |
| Y020.0 | X001.0 | Y010.0 | X020.0 |
| Y010.0 | X023.0 | Y123.0 | X017.0 |
| : | : | : | : |

LADDER DISPLAY SYSTEM

RELATED APPLICATIONS

The present application claims priority to Japanese Patent Application Number 2018-104949 filed May 31, 2018, the disclosure of which is hereby incorporated by reference herein in its entirety.

BACKGROUND OF THE INVENTION

Field of the Invention

The present invention relates to a ladder display system, and more particularly, to a ladder display system that displays ladders of two or more PLCs.

Description of the Related Art

Ladder programs to be executed in machine tools include: machine tool builder (MTB) ladder programs preinstalled by machine tool manufactures and user ladder programs made and executed by end users. When a user ladder program is executed in a machine tool, a programmable logic controller (PLC) is generally added to a numerical controller (NC) as shown in FIG. 1, and the user ladder program is executed in the added PLC.

JP 2016-004414 A is a prior art document related to a user ladder program. JP 2016-004414 A discloses a program editor that searches a user ladder program for a target circuit block and displays the circuit block on a display.

When a user makes a user ladder program, the user may need to refer to or rewrite a part of an MTB ladder program including a signal or a variable, for example. Conventional apparatuses such as PLCs or ladder editors can display and edit the ladder programs of themselves, however, can neither display nor edit the ladder programs of other apparatuses. In addition, machine tool manufactures are reluctant to open their entire MTB ladder programs to the public. Machine tool manufactures seldom allow users to refer to or search the entire MTB ladder programs without limitation from other apparatuses. With all the situations, if users can refer to at least a part of an MTB ladder program through another PLC for debugging or making a user ladder program, it is useful.

The present invention provides a solution to the situations. An object of the present invention is to provide a ladder display system that displays ladders of two or more PLCs.

SUMMARY OF THE INVENTION

A ladder display system according to an embodiment of the present invention includes: a first controller having a first ladder program; and a second controller having a second ladder program that performs input/output processing with the first ladder program, and further includes: an input/output signal table generating unit that generates an input/output signal table relating an input/output signal of the first ladder program to an input/output signal of the second ladder program; an external reference execution unit that specifies a signal of the second ladder program and requests transmission of at least a part of the first ladder program; a ladder program output unit that transmits at least a part of the first ladder program including a signal of the first ladder program corresponding to the specified signal of the second ladder program to the second controller; and a ladder program display unit that displays at least the part of the first ladder program output by the ladder program output unit on the second controller.

In the ladder display system according to the embodiment of the present invention, the ladder program display unit displays at least the part of the first ladder program output by the ladder program output unit in a pop-up area, in a different window, on a different display, or in a different tab area.

In the ladder display system according to the embodiment of the present invention, the ladder program output unit outputs a trace of a waveform of a signal of at least the part of the first ladder program corresponding to the specified signal of the second ladder program.

The present invention provides a ladder display system that displays ladders of two or more PLCs.

BRIEF DESCRIPTION OF THE DRAWINGS

The above or other objects and features of the present invention will be understood by reading the following description of embodiments with reference to the accompanying drawings.

DETAILED DESCRIPTION OF THE PREFERRED EMBODIMENTS

Figure 13:
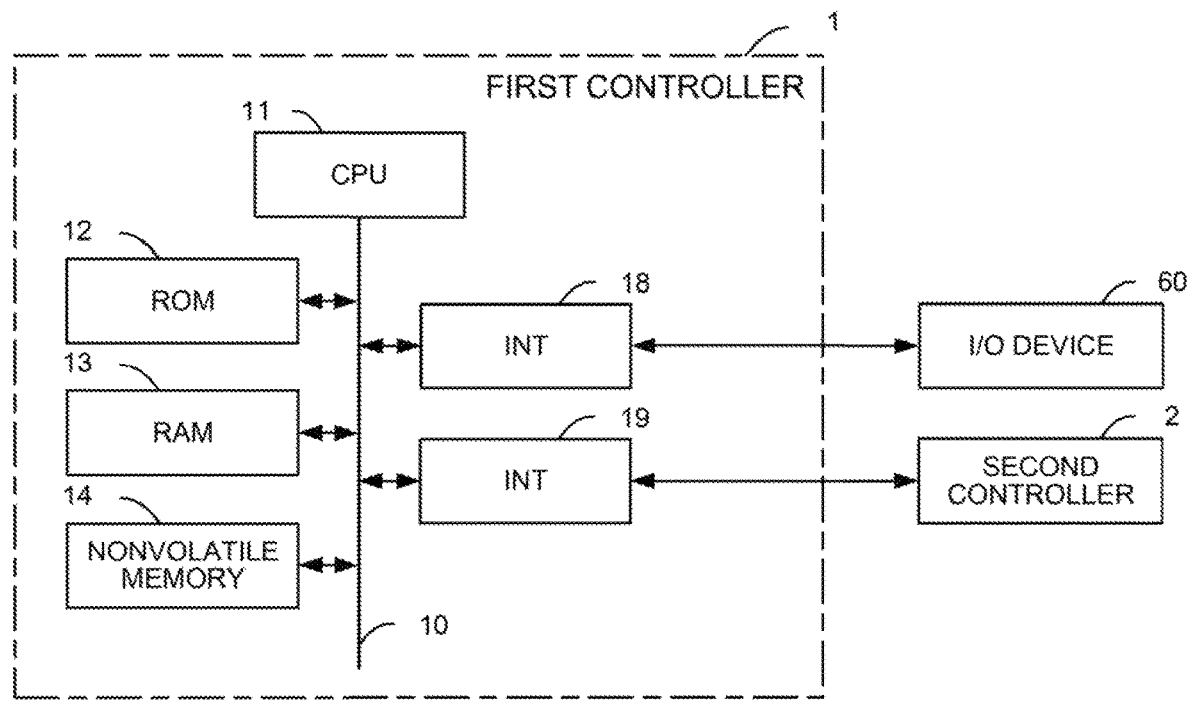
FIG. 13 shows a hardware structure of the ladder display system.
Figure 14:
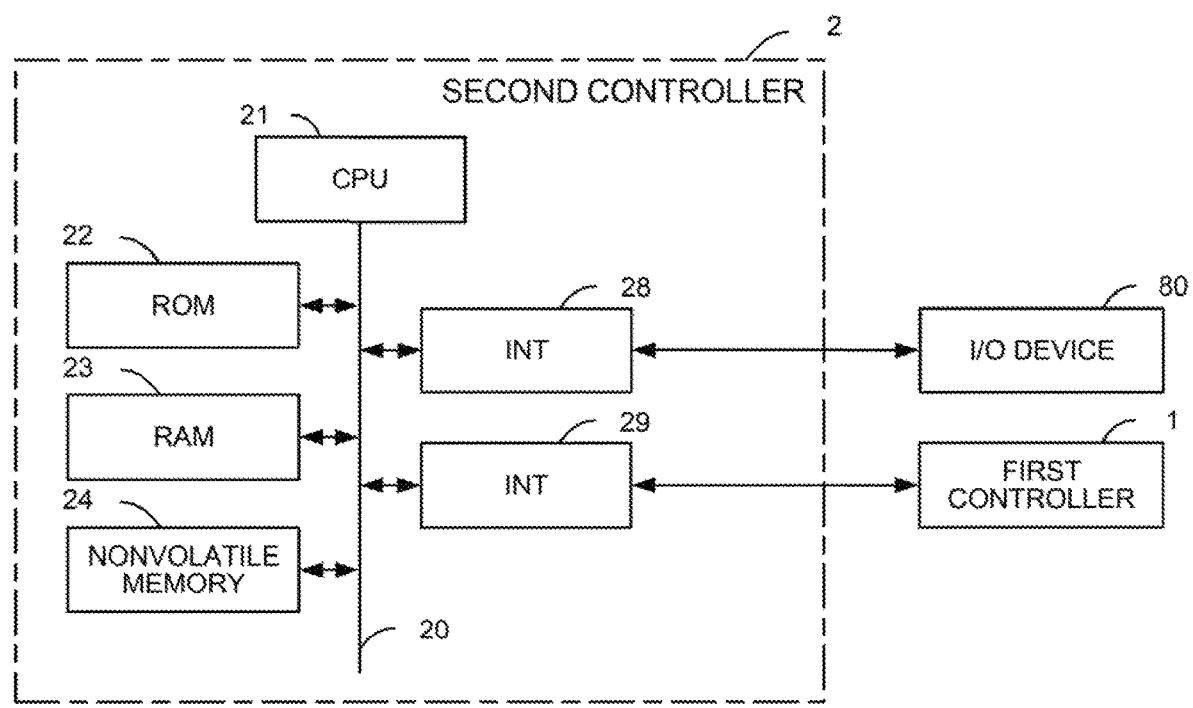
FIG. 14 shows a hardware structure of the ladder display system.

FIGS. 13 and 14 schematically show parts of hardware structures of a first controller 1 and a second controller 2, respectively, in a ladder display system 100 according to an embodiment of the present invention. The first controller 1 reads a ladder program, for example, to control an industrial machine (simply referred to as a machine hereinafter) such as a machine tool and a robot. The first controller 1 is a programmable logic controller (PLC), a numerical controller (NC) connected to a PLC, or an NC having the function of a PLC, for example. The first controller 1 includes: a central processing unit (CPU) 11, a read only memory (ROM) 12, a random access memory (RAM) 13, a nonvolatile memory 14, an interface 18, an interface 19, and a bus 10. The first controller 1 is connected to an input/output device 60 and the second controller 2.

The CPU 11 is a processor that controls the first controller 1 overall. The CPU 11 reads a system program from the ROM 12 through the bus 10. The CPU 11 controls the first controller 1 overall according to the system program.

The ROM 12 prestores the system program used for controlling the parts of the machine.

The RAM 13 temporarily stores data such as temporary calculation data, display data and data input by an operator through the input/output device 60.

The nonvolatile memory 14 is backed up by a battery (not shown), for example. The nonvolatile memory 14 thus maintains the data even if the power source of the first controller 1 is shut down. The nonvolatile memory 14 stores data such as data input through the input/output device 60 and ladder programs including an MTB ladder program. The programs and data in the nonvolatile memory 14 may be loaded in the RAM 13 to be executed and used.

The input/output device 60 is a data input/output device including a display and hardware keys. The input/output device 60 displays the information received from the CPU 11 through the interface 18 on the display. The input/output device 60 sends the instructions and data input through the hardware keys or the like to the CPU 11 through the interface 18. The input/output device 60 displays a ladder program stored in the nonvolatile memory 14 on the display, for example. A user can edit the ladder program on the display using the hardware keys.

The interface 19 is a communications interface that connects the first controller 1 and the second controller 2.

Figure 1:
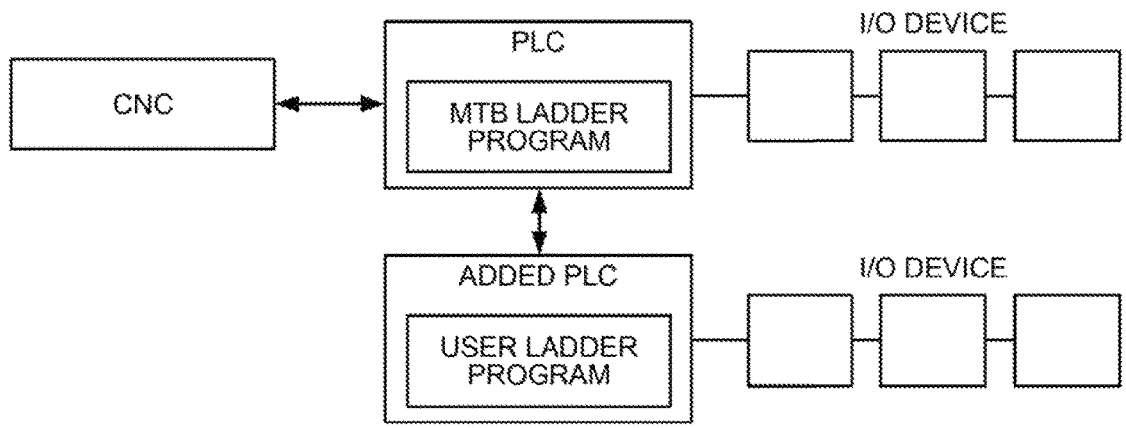
FIG. 1 shows an example of a situation related to reference to ladder programs between two PLCs.

The second controller 2 is an information processor that displays and edits a ladder program of the first controller 1. The second controller 2 is typically another PLC connected to the first controller 1. For example, in the system shown in FIG. 1, in which the added PLC reads the MTB ladder program from the PLC storing the MTB ladder program, the PLC storing the MTB ladder program corresponds to the first controller 1. The added PLC corresponds to the second controller 2.

The second controller 2 includes: a CPU 21, a ROM 22, a RAM 23, a nonvolatile memory 24, an interface 28, an interface 29, and a bus 20. The second controller 2 is connected to an input/output device 80 and the first controller 1.

The CPU 21 is a processor that controls the second controller 2 overall. The CPU 21 reads a system program from the ROM 22 through the bus 20. The CPU 21 controls the second controller 2 overall according to the system program.

The ROM 22 prestores the system program used for controlling various kinds of function of the second controller 2.

The RAM 23 temporarily stores data such as temporary calculation data, display data and data input by an operator through the input/output device 80.

The nonvolatile memory 24 is backed up by a battery (not shown), for example. The nonvolatile memory 24 thus maintains the data even if the power source of the second controller 2 is shut down. The nonvolatile memory 24 stores data such as data input through the input/output device 80 and ladder programs including a user ladder program. The programs and data in the nonvolatile memory 24 may be loaded in the RAM 23 to be executed and used.

The input/output device 80 is a data input/output device including a display and hardware keys. The input/output device 80 displays the information received from the CPU 21 through the interface 28 on the display. The input/output device 80 sends the data input through the key board or the like to the CPU 21 through the interface 28. The input/output device 80 displays a ladder program stored in the nonvolatile memory 24 on the display, for example. A user can edit the ladder program on the display using the hardware keys. In this embodiment, the input/output device 80 can display a ladder program acquired from the first controller 1 on the display.

The interface 29 is a communications interface that connects the second controller 2 and the first controller 1.

Figure 15:
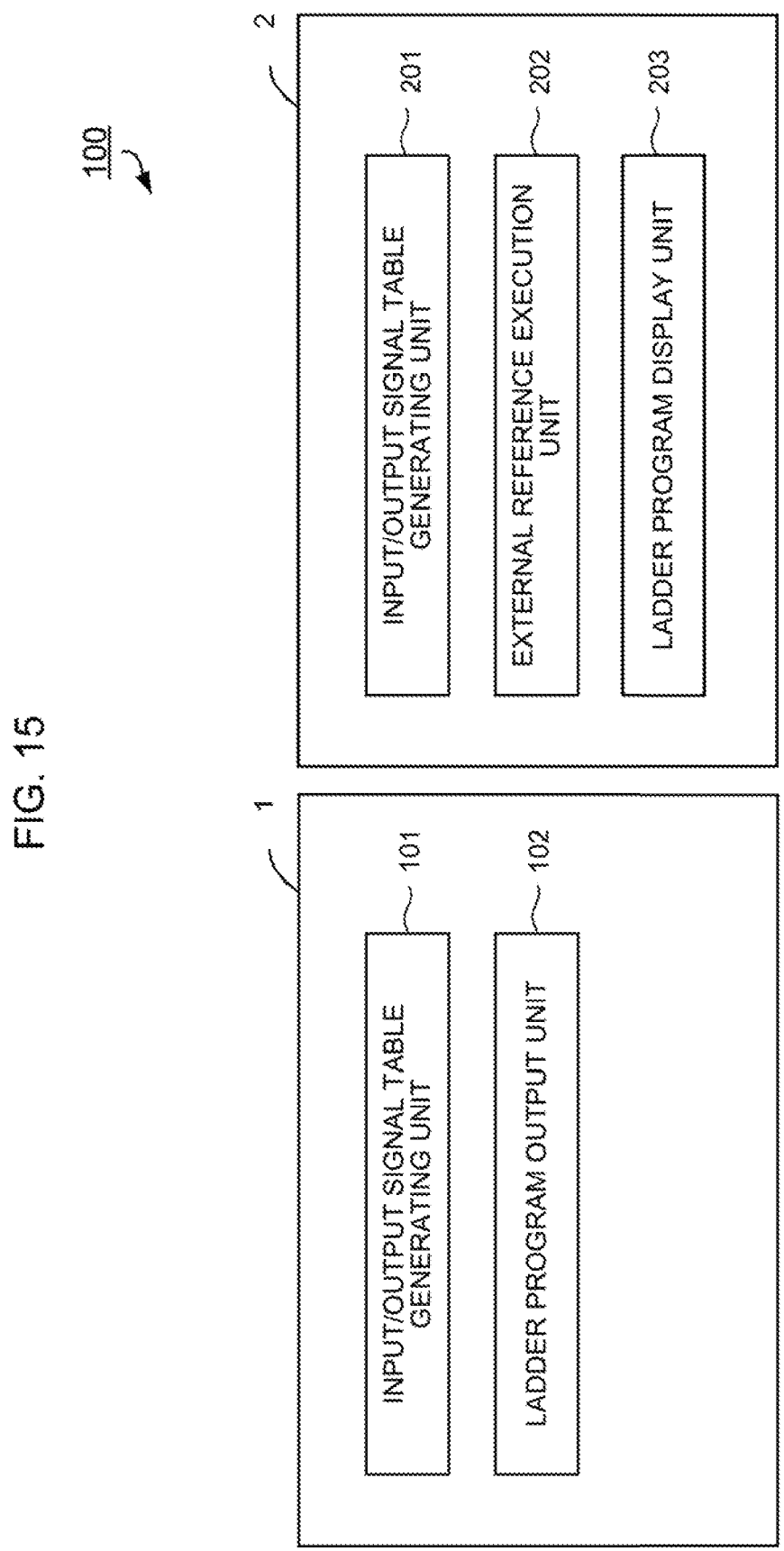
FIG. 15 shows a functional structure of the ladder display system.

FIG. 15 is a block diagram schematically showing functional structures of the first and second controllers 1 and 2. The first controller 1 is a PLC that has a ladder program to read. The first controller 1 includes an input/output signal table generating unit 101 and a ladder program output unit 102. The second controller 2 is a PLC that reads the ladder program from the first controller 1. The second controller 2 includes an input/output signal table generating unit 201, an external reference execution unit 202, and a ladder program display unit 203.

Figure 2:
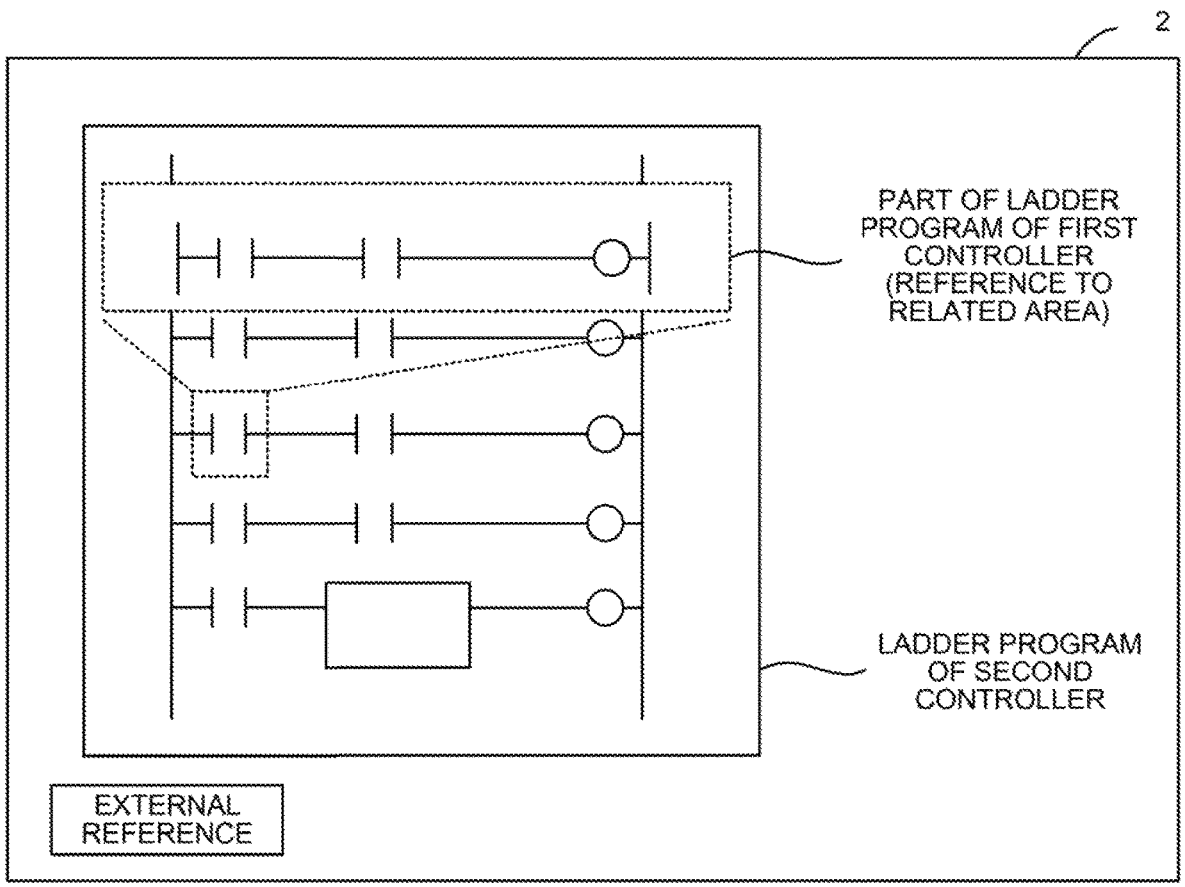
FIG. 2 shows an example of an operation of a ladder display system.

The second controller 2 of this embodiment acquires a part of a ladder program (e.g. an MTB ladder program) of the first controller 1. The part of the ladder program is related to a specific signal of a ladder program (e.g. a user ladder program) of the second controller 2. As shown in FIG. 2, the second controller 2 displays the part of the ladder program acquired from the first controller 1 in a pop-up area or the like. This allows a user to refer to the part of the ladder program of the first controller 1 on the second controller 2.

Figures 3, 6:
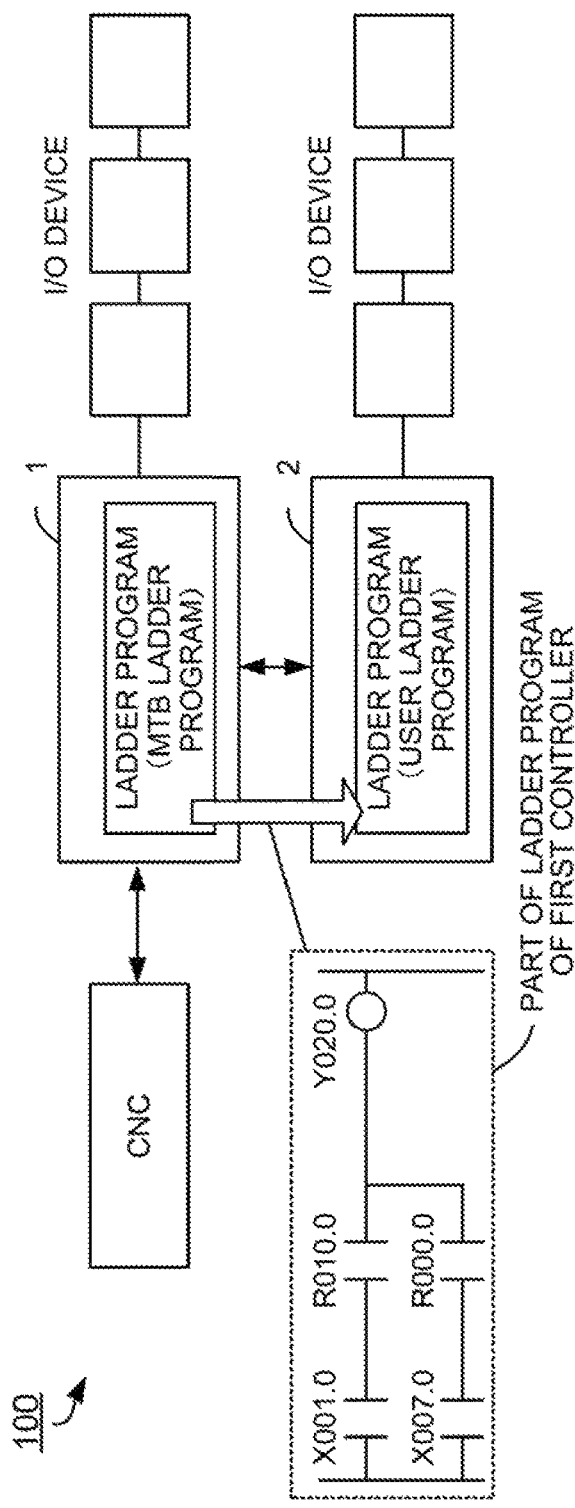
FIG. 3 is an example of an input/output signal table.
FIG. 6 shows an example of an operation of the first controller.

The input/output signal table generating units 101 and 201 generate an input/output signal table like the one shown in FIG. 3. The input/output signal table lists a correspondence between an input/output signal of the first controller 1 and an input/output signal of the second controller 2. Each PLC stores a correspondence between the name of each input/output signal and the I/O device assigned for the name of each input/output signal in a predetermined storage area. The input/output signal table generating unit 101 acquires the information on a correspondence between the name of an input/output signal of the first controller 1 and the assigned I/O device from the first controller 1, and the input/output signal table generating unit 201 acquires the information on a correspondence between the name of an input/output signal of the second controller 2 and the assigned I/O device from the second controller 2. The input/output signal table generating units 101 and 201 integrate the acquired information using the information on the assigned I/O device as key information, and generate an input/output signal table.

The external reference execution unit 202 requests the first controller 1 to transmit at least a part of the ladder program of the first controller 1. The part of the ladder program is related to a given input signal of the ladder program of the second controller 2.

Figure 4:
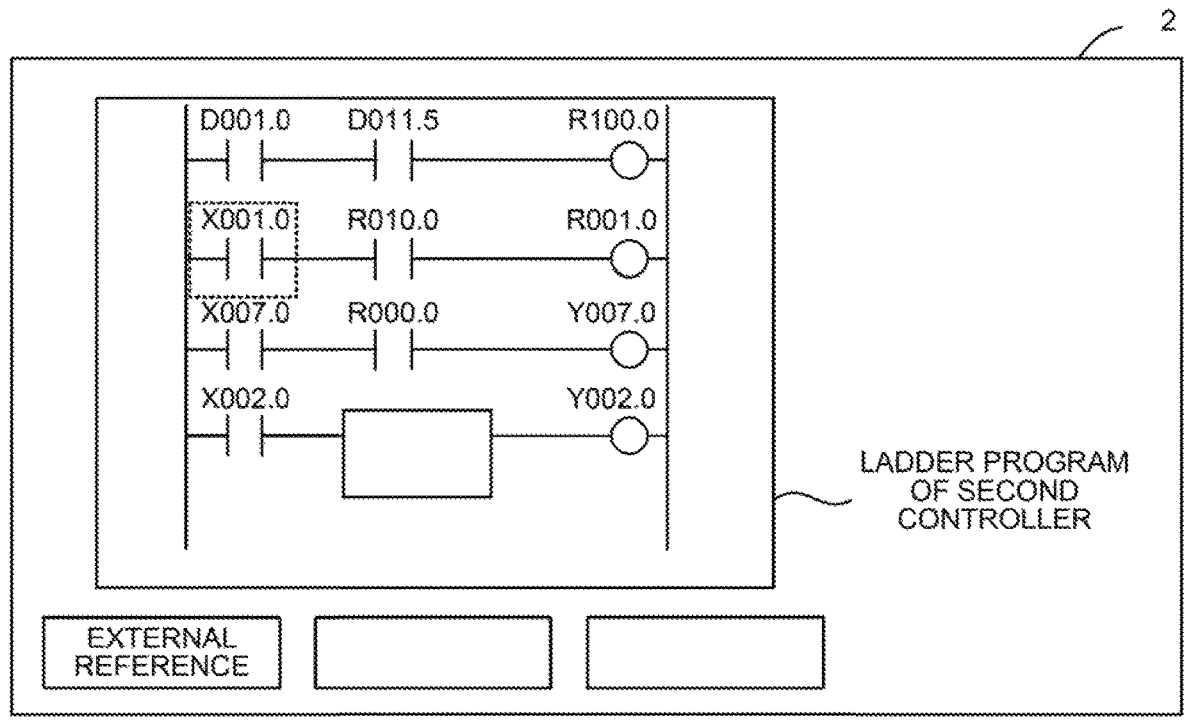
FIG. 4 shows an example of an operation of a second controller.

FIG. 4 shows a user interface at the start-up of the external reference execution unit 202. In this example, a user selects an input signal (e.g. the signal "X001.0" enclosed by the broken line) in the ladder program shown on the display of the second controller 2 (the ladder program stored in the second controller 2). When the user presses the "external reference" button at the lower left on the display, the external reference execution unit 202 starts up. The external reference execution unit 202 refers to the input/output signal table and identifies an output signal of the first controller 1 corresponding to the selected input signal "X001.0." In the example in FIG. 3, the output signal of the first controller 1 corresponding to the signal "X001.0" is "Y020.0." The external reference execution unit 202 requests the first controller 1 to transmit a part of the ladder program including the signal "Y020.0."

In response to the request from the external reference execution unit 202, the ladder program output unit 102 of the first controller 1 transmits the part of the ladder program (stored in the first controller 1) to the second controller 2. The ladder program output unit 102 may simply transmit the entire ladder program from the first controller 1. As described above, however, machine tool manufactures are especially reluctant to open their entire MTB ladder programs to the public without limitation. The ladder program output unit 102 thus extracts a necessary part of the ladder program of the first controller 1 and transmits the part of the ladder program to the second controller 2.

Figure 5:
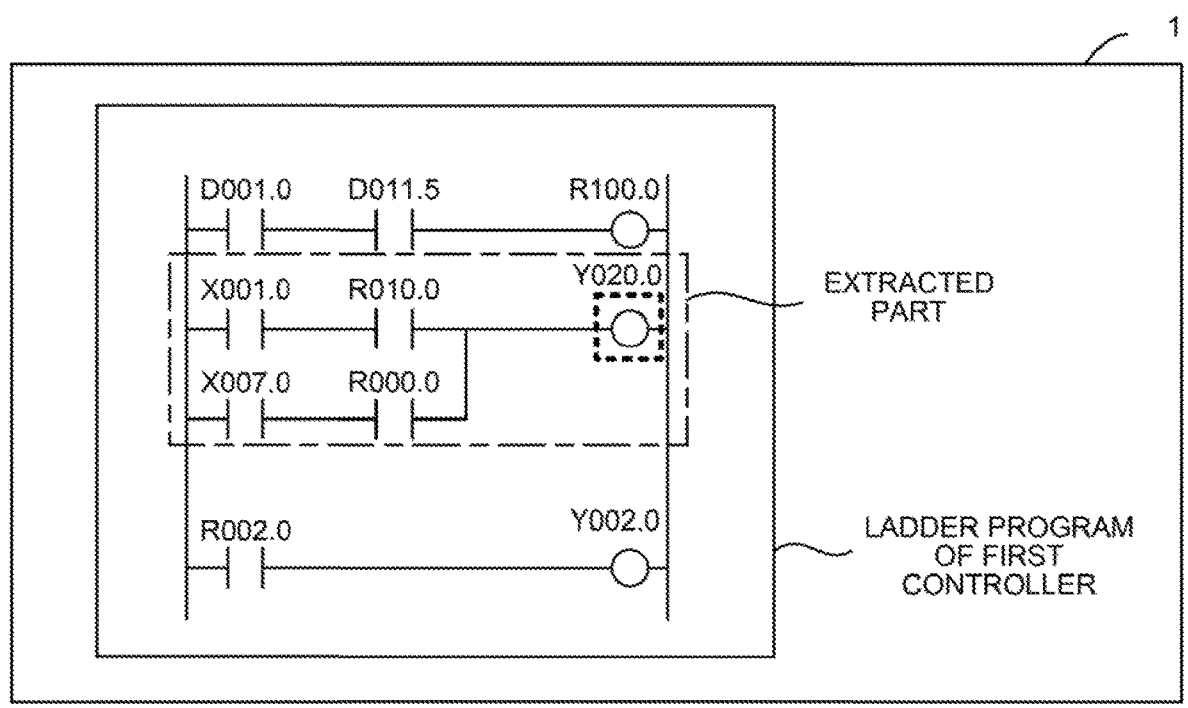
FIG. 5 shows an example of an operation of a first controller.

When the external reference execution unit 202 requests transmission of the part of the ladder program including the output signal "Y020.0", for example, the ladder program output unit 102 extracts a predetermined number of lines of the ladder program including the output signal "Y020.0" in the first controller 1 as shown in FIG. 5. The ladder program output unit 102 of the first controller 1 then transmits the extracted part of the ladder program to the second controller 2 as shown in FIG. 6. The ladder program output unit 102 may transmit the extracted part of the ladder program in any format. The ladder program output unit 102 may transmit the extracted part of the ladder program to the second controller 2 in a bitmapped image format, for example.

Figure 7:
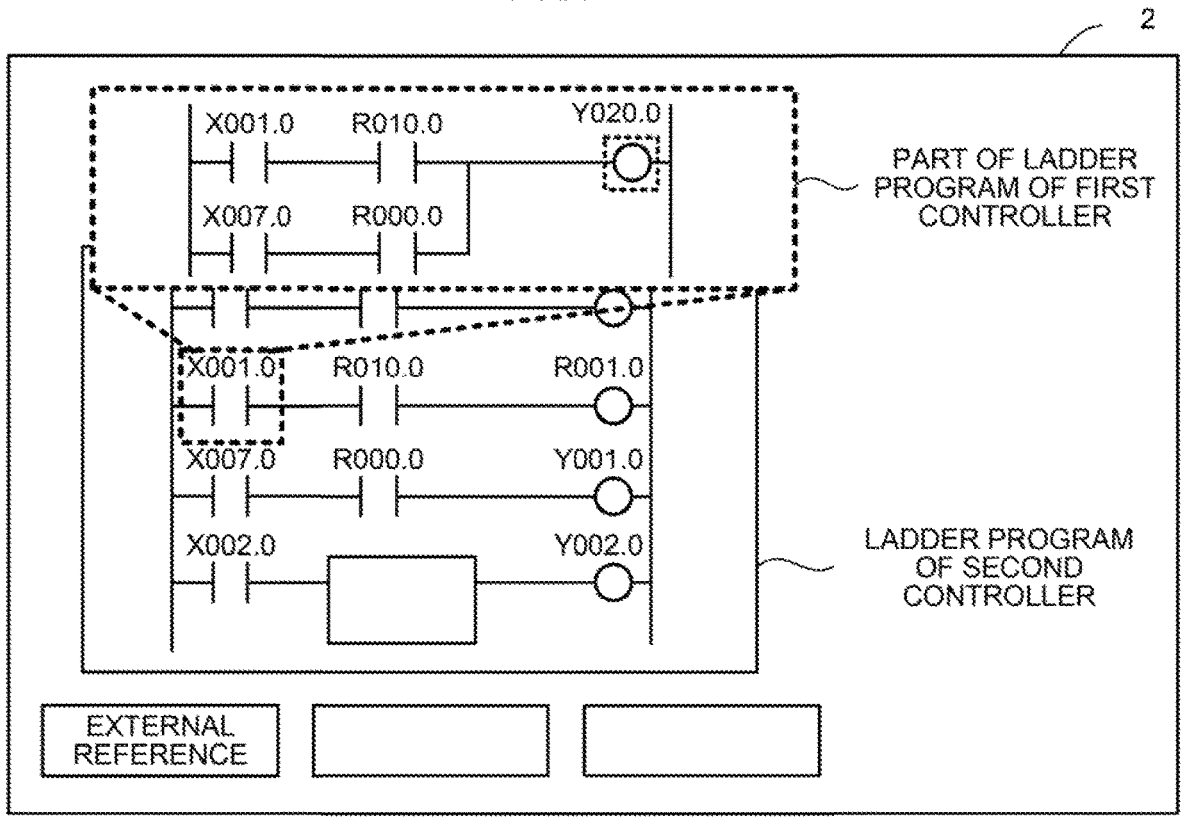
FIG. 7 shows an example of an operation of the second controller.

The ladder program display unit 203 of the second controller 2 receives (the part of) the ladder program of the first controller 1 from the ladder program output unit 102. The ladder program display unit 203 displays (the received part of) the ladder program on the display of the second controller 2. As shown in FIG. 7, for example, the ladder program display unit 203 may display the image of the corresponding part of the ladder program of the first controller 1 in a pop-up area near an area displaying the input signal selected by the user. The way of displaying the image is not limited to that shown in FIG. 7. The ladder program display unit 203 may display the part of the ladder program of the first controller 1 on a different display, in a different window, or in a different tab area from those for the ladder program of the second controller 2, for example. The ladder program display unit 203 may display the part of the ladder program of the first controller 1 and the ladder program of the second controller 2 side by side, for example.

Figure 8:
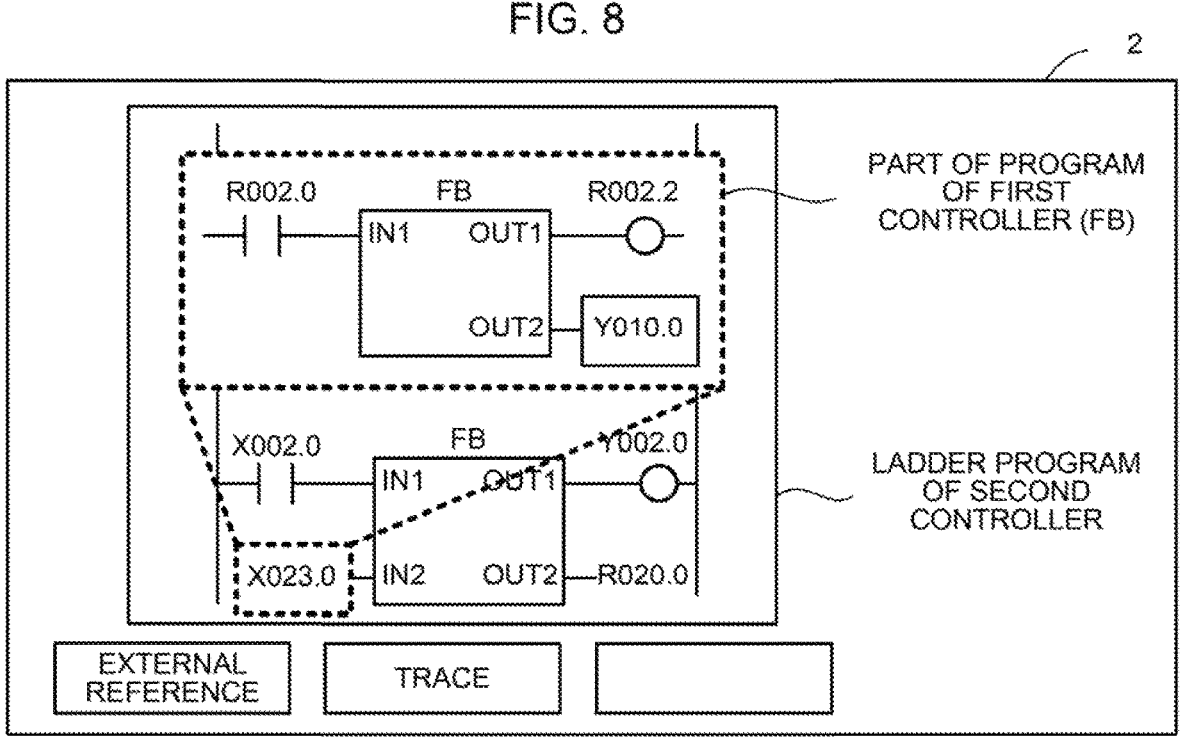
FIG. 8 shows a modified embodiment of the ladder display system.
Figure 9:
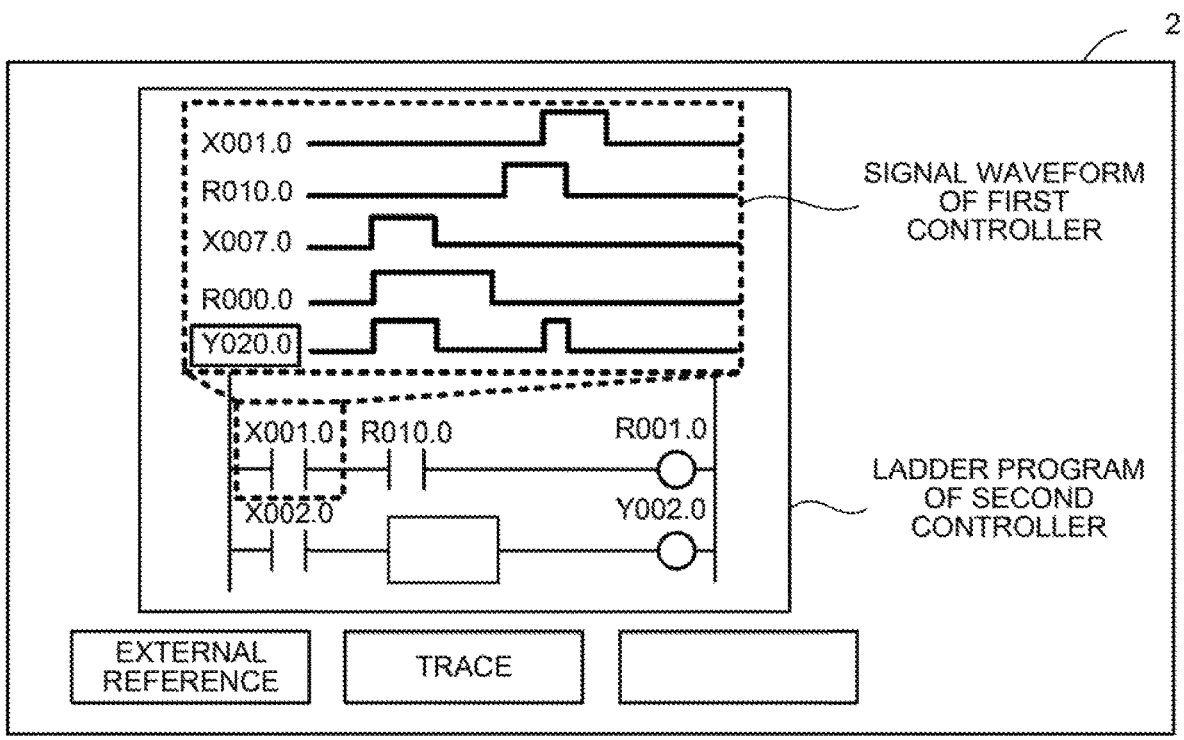
FIG. 9 shows a modified embodiment of the ladder display system.

FIGS. 8 and 9 show modified embodiments of the above embodiment. FIG. 8 shows an embodiment in which a part of the program of the first controller 1 is expressed not in a ladder diagram but in a function block (FB) diagram. The ladder program output unit 102 can transmit a program including an FB, as well as a ladder program, in a bitmapped image format or other data format to the second controller 2. Even when the program of the first controller 1 is expressed in an FB diagram, the ladder program output unit 102 can transmit a part of the program of the first controller 1 corresponding to a user-selected part of the program of the second controller 2 in a bitmapped image format or other data format to the second controller 2.

FIG. 9 shows a result of trace of the waveform of a signal of the ladder program of the first controller 1 instead of a ladder diagram. In the example in FIG. 7, when a user presses the "external reference" button, the ladder program output unit 102 outputs a part of the ladder program of the first controller 1. In the example in FIG. 9, when a user presses the "trace" button at the bottom, for example, the ladder program output unit 102 outputs a result of trace of the waveform of a signal included in the ladder program of the first controller 1. The way of tracing a signal waveform and the way of generating images of trace results are known arts, and thus the detailed description thereof will be omitted here.

Figure 10A:
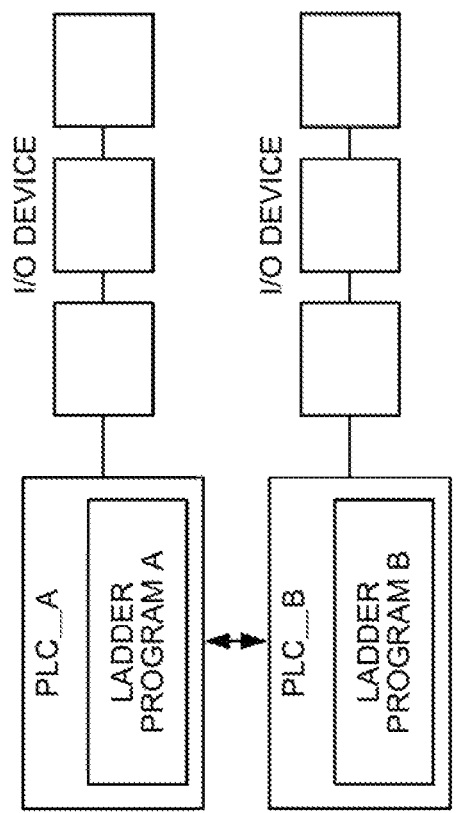
FIG. 10A shows a modified embodiment of the ladder display system.
Figure 10B:
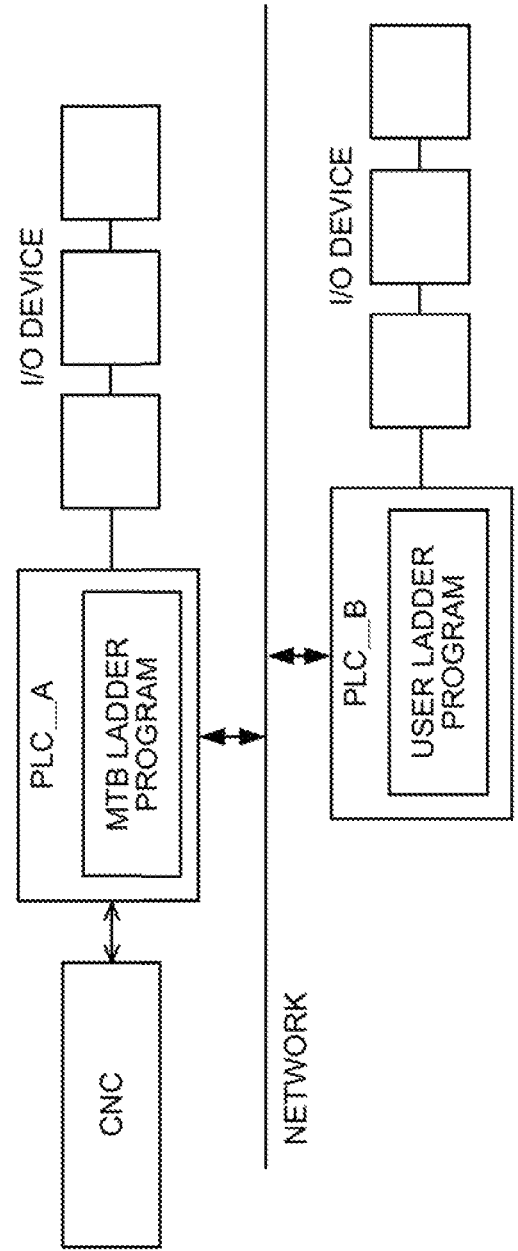
FIG. 10B shows a modified embodiment of the ladder display system.

FIGS. 10A and 10B show modified embodiments of the above embodiment. The first and second controllers 1 and 2 are not necessarily PLCs incorporated in CNCs. As shown in FIG. 10A, for example, the first and second controllers 1 and 2 may be PLCs to be used separately from CNCs. As shown in FIG. 10B, for example, the first and second controllers 1 and 2 may be connected with each other via a communications network. In other words, the first and second controllers 1 and 2 may be remote from each other.

Figure 11:
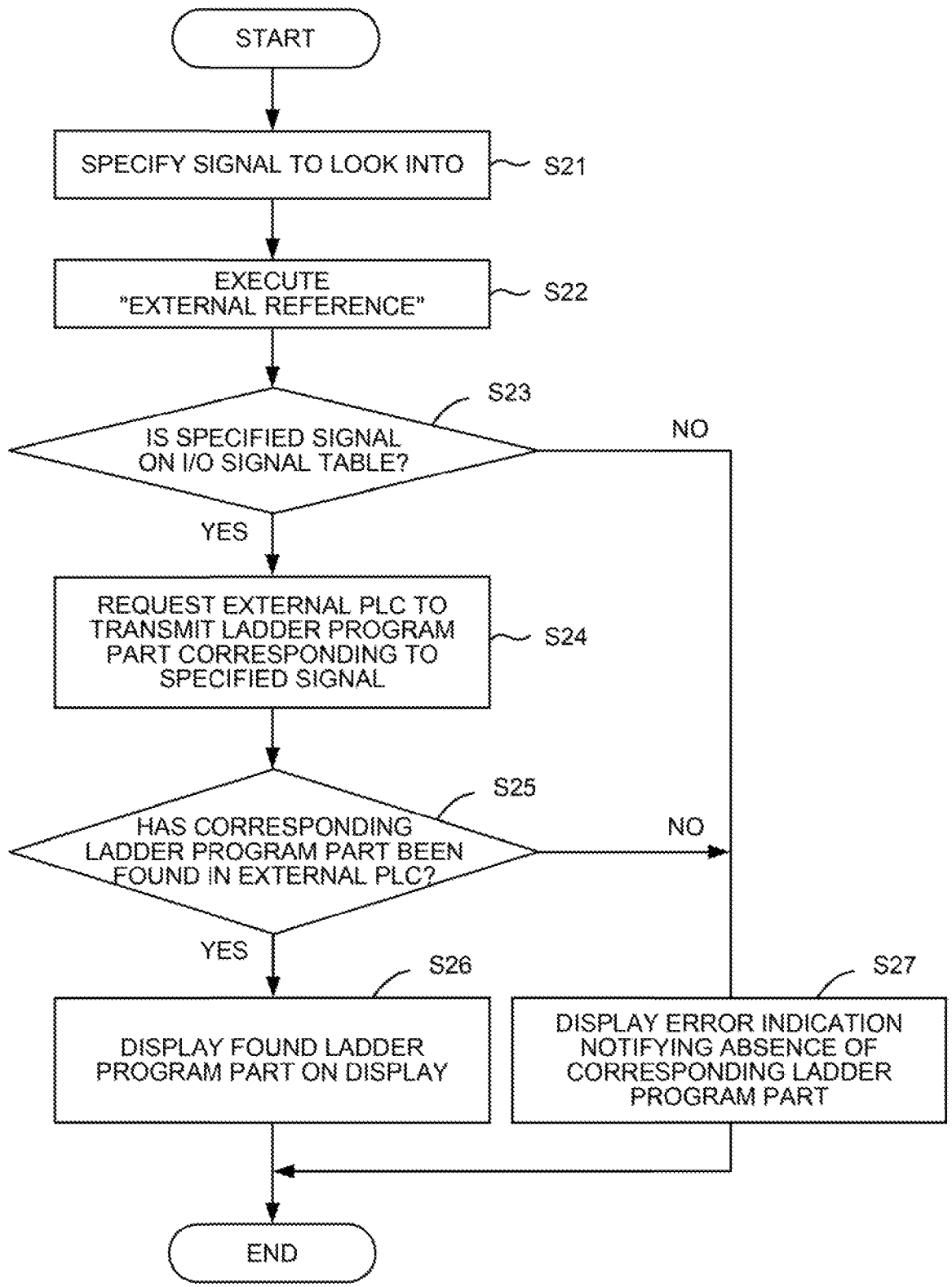
FIG. 11 is an example of a flow chart of a series of operations of the second controller.

FIG. 11 shows a flow chart of a series of operations of the second controller 2.

The external reference execution unit 202 of the second controller 2 displays a ladder program (typically a user ladder program) of the second controller 2 on the display. The external reference execution unit 202 then receives the information on a signal to look into from a user and specifies the signal (S21). From the viewpoint of the user, the user selects a signal that he or she wants to look into on the display.

When the user presses the "external reference" button, the external reference execution unit 202 receives the instruction of the "external reference" (S22) and determines whether the signal specified at S21 is on the input/output signal table or not (S23). If the signal specified at S21 is on the input/output signal table, the external reference execution unit 202 requests the ladder program output unit 102 of the first controller 1 to transmit a part of a ladder program (typically an MTB ladder program) of the first controller 1 corresponding to the signal specified at S21 (S24).

The external reference execution unit 202 then determines whether the part of the ladder program requested at S24 has been found in the first controller 1 or not (S25). If it is determined that the part of the ladder program has been found at S25, the ladder program display unit 203 receives the part of the ladder program and displays it on the display (S26).

If it is determined that the specified signal is not on the input/output signal table at S23, or if it is determined that the requested part of the ladder program has not been found at S25; the ladder program display unit 203 shows an error indication and ends the process.

Figure 12:
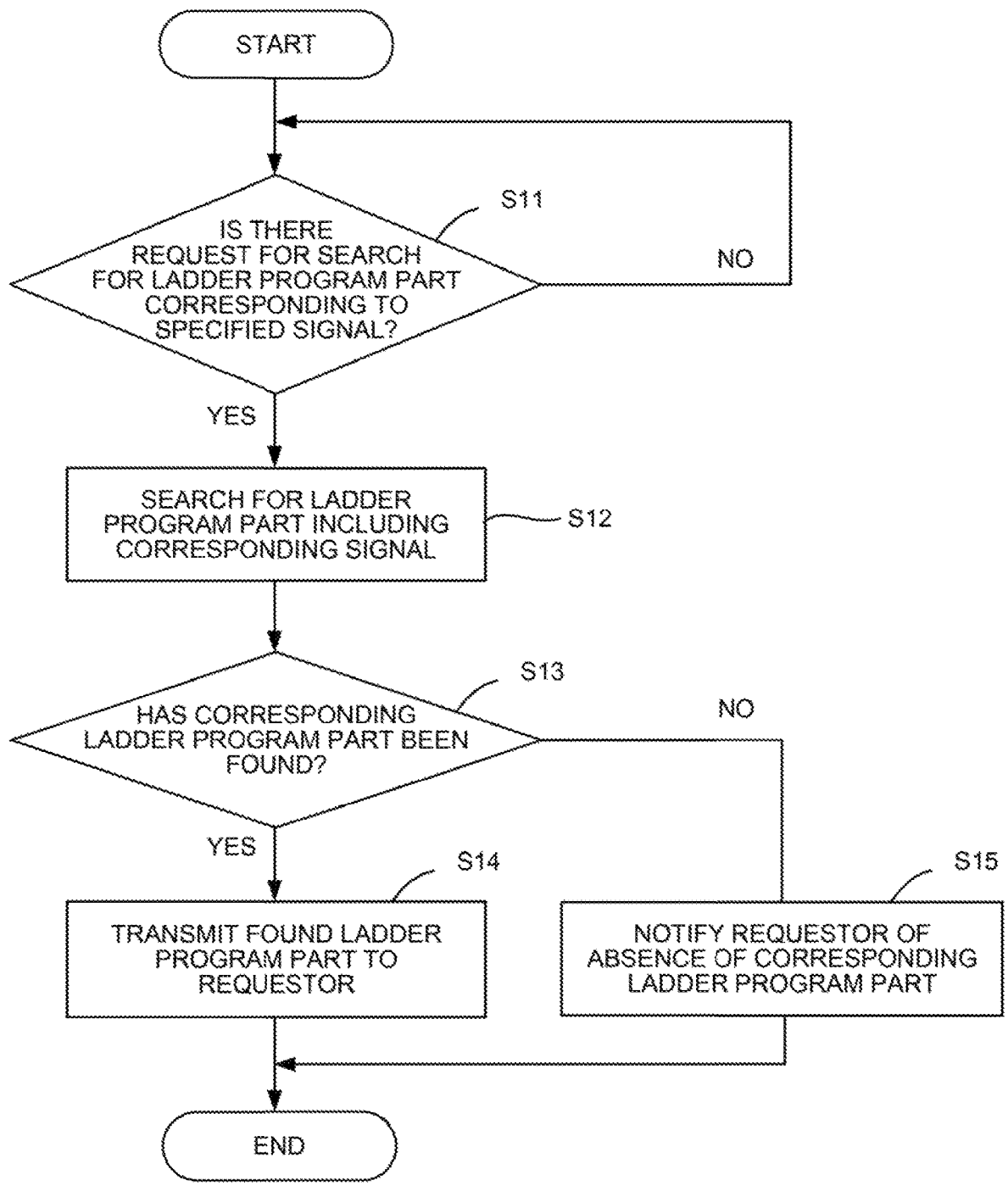
FIG. 12 is an example of a flow chart of a series of operations of the first controller.

FIG. 12 shows a flow chart of a series of operations of the first controller 1.

The ladder program output unit 102 of the first controller 1 receives, from the external reference execution unit 202 of the second controller 2, the request for search for a part of the ladder program (typically an MTB ladder program) of the first controller 1 corresponding to the signal specified at S21 (S11) and performs the search (S12).

If the part of the ladder program has been found (S13), the ladder program output unit 102 transmits the part of the ladder program to the ladder program display unit 203 of the second controller 2 (S14).

If the part of the ladder program has not been found at S13, the ladder program output unit 102 sends an error notification to the ladder program display unit 203 and ends the process (S15).

According to the embodiments of the present invention, when a user selects a signal to look into, the second controller 2 identifies an area to refer to in the ladder program of the first controller 1. This enables the first controller 1 to provide the information on the limited area of the ladder program. The embodiments of the present invention thus satisfy the users' needs for referring to a ladder program while avoiding potential demerits in opening the ladder program to the public without limitation.

In the embodiments of the present invention, the first and second controllers 1 and 2 cooperate to generate an input/output signal table. Based on the information in the table, although the first and second controllers 1 and 2 do not share the information on their ladder programs in advance, the second controller 2 specifies a signal in its ladder program and identifies a corresponding part of the ladder program of the first controller 1, the information of which is disclosed by the first controller.

This allows a user of the second controller 2 to make a ladder program for the second controller 2 while considering potential effects of his or her work on the first controller 1.

Although some embodiments of the present invention have particularly been described above, the present invention is not limited to the above embodiments and can appropriately be modified and embodied in various ways.

The invention claimed is:

1. A ladder display system comprising:
    a first controller having a first ladder program with a first plurality of rungs for controlling a machine; and
    a second controller having a second ladder program with a second plurality of rungs that performs input/output processing with the first ladder program for controlling the machine,
    wherein the ladder display system is configured to:
    generate, by at least one of the first controller and the second controller, an input/output signal table relating:
    a) input signals of the second plurality of rungs of the second ladder program to output signals of the first plurality of rungs of the first ladder program, and b) input signals of the first plurality of rungs of the first ladder program to output signals of the second plurality of rungs of the second ladder program,
    specify, by the second controller, a specified input signal of a specified rung of the second plurality of rungs in the second ladder program,
    request, by the second controller, the first controller to transmit a corresponding rung of the first plurality of rungs of the first ladder program, where the corresponding rung of the first ladder program includes a corresponding output signal of the first ladder program that corresponds to the specified input signal of the specified rung of the second ladder program as specified in the input/output signal table,
    transmit, by the first controller, the corresponding rung to the second controller, and
    display, by the second controller, the corresponding rung of the first ladder program.

2. The ladder display system according to claim 1, wherein the second controller displays the corresponding rung of the first ladder program transmitted by the first controller in a pop-up area, in a different window, on a different display, or in a different tab area.

3. The ladder display system according to claim 1, wherein the first controller outputs a trace of a waveform of a signal of at least the corresponding rung of the first ladder program, the trace of a waveform of the signal corresponding to the specified input signal of the specified rung of the second ladder program.

* * * * *